(12) United States Patent
Hellmig

(10) Patent No.: US 8,045,437 B2
(45) Date of Patent: *Oct. 25, 2011

(54) METHOD AND DEVICE FOR RECORDING MARKS REPRESENTING DATA IN AN INFORMATION LAYER OF AN OPTICAL RECORD CARRIER

(75) Inventor: Joachim Willhelm Hellmig, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 3 days.

This patent is subject to a terminal disclaimer.

(21) Appl. No.: 12/574,188

(22) Filed: Oct. 6, 2009

(65) Prior Publication Data

US 2010/0020665 A1 Jan. 28, 2010

Related U.S. Application Data

(63) Continuation of application No. 10/517,918, filed on Dec. 14, 2004, now Pat. No. 7,619,957.

(30) Foreign Application Priority Data

Jun. 18, 2002 (EP) .................................. 02077407

(51) Int. Cl.
*G11B 7/006* (2006.01)
(52) U.S. Cl. .................................................. 369/59.11
(58) Field of Classification Search .... 369/44.37–44.39, 369/47.5–47.53, 53.31, 59.1–59.12, 59.23–59.24, 369/94, 116
See application file for complete search history.

(56) References Cited

U.S. PATENT DOCUMENTS

| 5,291,470 A | 3/1994 | Nishiuchi et al. |
| 5,412,626 A | 5/1995 | Ohno et al. |
| 5,608,710 A | 3/1997 | Minemura et al. |
| 5,751,669 A | 5/1998 | Shiratori |
| 5,815,477 A | 9/1998 | Kimura et al. |
| 5,825,742 A | 10/1998 | Tanaka et al. |
| 5,848,043 A | 12/1998 | Takada et al. |
| 6,272,100 B1 | 8/2001 | Toda et al. |
| 6,285,647 B1 | 9/2001 | Van Woudenberg et al. |
| 6,424,610 B2 | 7/2002 | Ohno |

(Continued)

FOREIGN PATENT DOCUMENTS

EP 0286126 A2 12/1988

(Continued)

OTHER PUBLICATIONS

H.A. Wierenga, Phase Change Recording: Options for 10-20 GB (Dual Layer, High NA, and Blue), Proceedings of the SPIE the International Society for Optical Engineering, vol. 3401, 1998, pp. 64-70.

*Primary Examiner* — Nathan Danielsen

(57) ABSTRACT

A device and method of recording marks representing data in an information layer of a record carrier includes irradiating the information layer by a pulsed radiation beam, each mark being written by a sequence of pulses. The recorded marks are erasable by irradiating the information layer with an erase radiation beam. The erase radiation beam has a first erase power level (e1) for a first erase period (t1), a second erase power level (e2) higher than or equal to the first erase power level (e1) for a second erase period (t2), and a third erase power level (e3) lower than the second erase power level (e2) for a third erase period (t3).

11 Claims, 3 Drawing Sheets

U.S. PATENT DOCUMENTS

Figure 3:
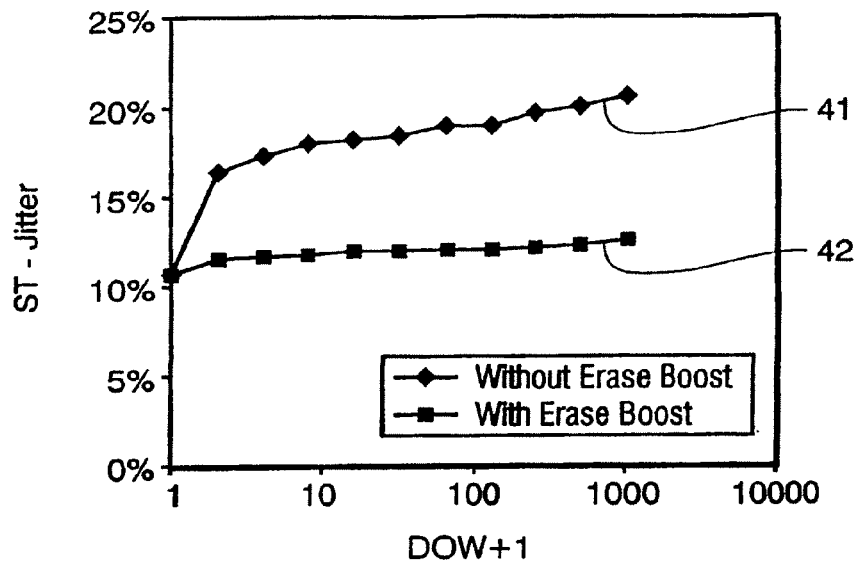

| | | |
|---|---|---|
| 6,456,584 B1 | 9/2002 | Nagata et al. |
| 6,894,965 B2 | 5/2005 | Furumiya et al. |
| 2001/0012257 A1 | 8/2001 | Suzuki et al. |
| 2002/0003762 A1 | 1/2002 | Dekker |
| 2002/0018419 A1* | 2/2002 | Watabe .................. 369/53.26 |
| 2002/0031075 A1* | 3/2002 | Araki et al. .................. 369/94 |
| 2002/0080702 A1* | 6/2002 | Asada et al. .................. 369/59.1 |

FOREIGN PATENT DOCUMENTS

| | | |
|---|---|---|
| EP | 0318200 A | 5/1989 |
| EP | 0851413 A2 | 7/1998 |
| EP | 0947910 A2 | 10/1999 |
| JP | 6004867 | 1/1994 |
| JP | 6295440 A | 10/1994 |
| JP | 7105585 A | 4/1995 |
| JP | 07129955 | 5/1995 |
| JP | 9091703 A | 4/1997 |
| JP | 11273075 | 10/1999 |
| JP | 11345428 A | 12/1999 |
| JP | 200123367 A | 4/2000 |
| WO | 0060584 A1 | 10/2000 |
| WO | 0104885 A1 | 1/2001 |
| WO | 0178072 A1 | 10/2001 |
| WO | 0186642 A1 | 11/2001 |

* cited by examiner

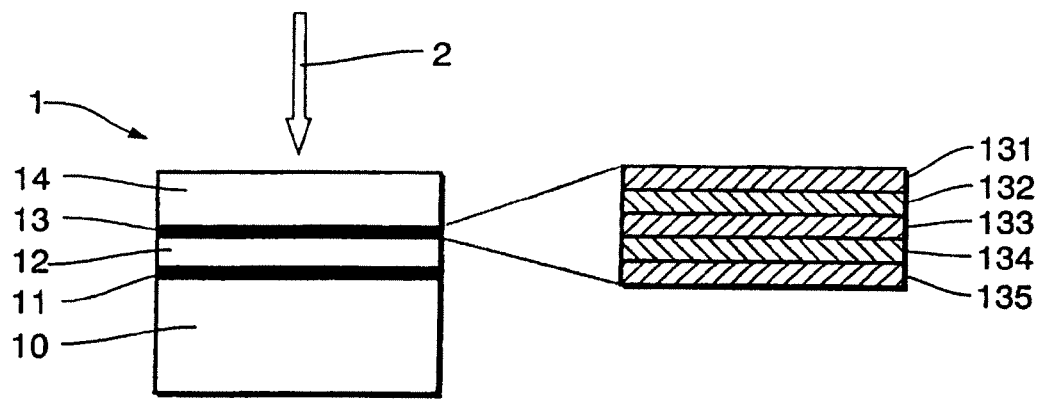
FIG.1a  FIG.1b
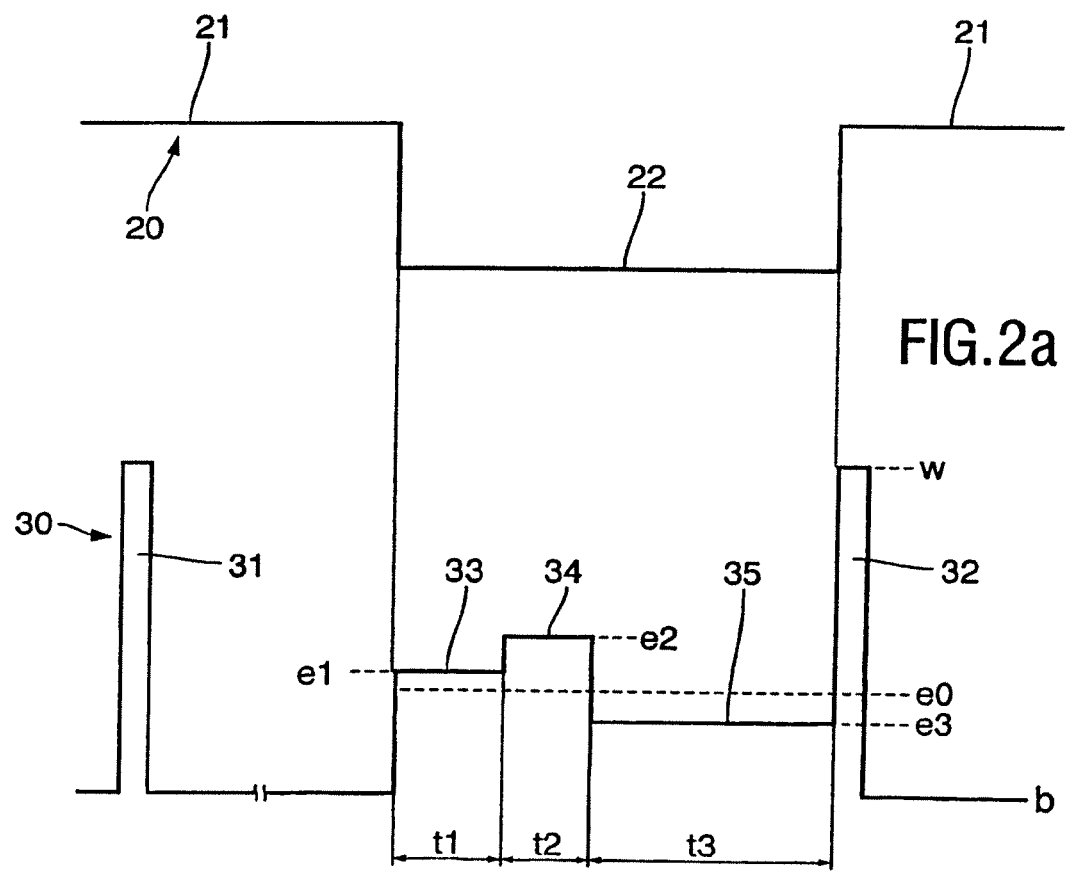
FIG.2a
FIG.2b

METHOD AND DEVICE FOR RECORDING MARKS REPRESENTING DATA IN AN INFORMATION LAYER OF AN OPTICAL RECORD CARRIER

This is a continuation of Ser. No. 10/517,918 filed Dec. 14, 2004 and is incorporated by reference herein.

The present invention relates to a method of recording marks representing data in an information layer of a record carrier by irradiating the information layer by means of a pulsed radiation beam, each mark being written by a sequence of pulses, the recorded marks being erasable by irradiating the information layer with an erase radiation beam. The invention further relates to a corresponding optical recording device for recording marks representing data in an information layer of a record carrier by irradiating the information layer by means of a pulsed radiation beam, the device comprising a radiation source providing said radiation beam and a control unit for controlling the power of said radiation beam such that each mark is written by a sequence of pulses, the recorded marks being erasable by irradiating the information layer with an erase radiation beam.

Such a method and device are known from the WO01/04885 A1. Therein a mark is written in a phase change layer of a record carrier by a sequence of radiation pulses. A trailing power level having a value higher than the erase power level is introduced after a last write pulse in a sequence of radiation pulses. Additionally, the power level of the last write pulse in a sequence may be raised. This results in a reduced jitter of the marks being written, especially when writing takes place at high recording speeds. In this way marks are written in a phase change layer of a record carrier. The area between two successive marks is referred to as a space. The pattern of marks and spaces on a record carrier represents the information stored on that record carrier.

A factor-of-two storage capacity increase of a rewritable optical recording media can be achieved by introduction of a second recording layer such as described in "Title Phase-Change Recording: Options for 10 to 20 GB (dual layer, high NA, and blue)", Wierenga H. A., Proceedings of the SPIE The International Society for Optical Engineering (USA), vol. 3401, p. 64-70, 1998. To access both recording layers, the layer closer to the objective lens of the recording device needs to be transparent. Making such a transparent recording layer requires a major change of the recording layer stack-design. In single layer discs, this stack consists typically of a metal mirror layer, dielectric interference layers, and a phase-change layer. However, these types of stacks are not transparent due to the metal mirror layer. Leaving out of the metal mirror layer in dual-layer discs has not only consequences for the behavior of the stack (that is becoming at least partially transparent), but also for its thermal characteristics.

In transparent dual-layer recording stacks, transparent heat sinks are introduced to achieve at least a moderate cooling of the phase-change layer without compromising the transparency of the stack. The slower cooling characteristic of such a stack results in a heat accumulation which causes two kinds of problems. First, longer cooling gaps in between the write pulses are needed during writing of marks. This can be achieved by using shorter write pulses. Second, the temperature of the heat sink needs to be low at the beginning of a mark. The most straightforward solutions are a reduction of the erase power during the space write-strategy or the introduction of a cooling gap before the first write pulse. However, experiments in optical recording systems (such as, for example, DVD) have shown that both strategies result in a poor overwrite performance.

It is therefore an object of the present invention to provide a method and a device for recording marks in an information layer of a record carrier by which a reduction of the temperature of a transparent heat sink is accomplished without compromising the overwrite performance.

This object is achieved according to the present invention by providing a method according to the preamble wherein said erase radiation beam has a first erase power level for a first erase period, a second erase power level higher than or equal to said first erase power level for a second erase period, and a third erase power level lower than said second power level for a third erase period. The object is further achieved by providing a corresponding recording device.

The present invention is based on the idea to divide the space write strategy into at least two, preferably three, different power levels. At the beginning of a space, a one- or two-stage erase power level boost is used to heat the stack quickly. The initial stage of a one-stage boost or the first stage in case of a two-stage boost is needed to prevent re-crystallization at the end of the previous mark. Thereafter, that is after said initial stage or after the second boost of a two-stage boost, the erase power is lowered to a value which is substantially lower than that required in conventional space write strategies without a boost. The net result is the desired reduction of the stack temperature before the following mark to be recorded.

The combination of the above described new write strategy and a stack with one transparent heat sink layer, preferably made of Indium Tin Oxide (ITO), especially results in a very good overwrite performance.

In another embodiment, the third erase power level is lower than the erase power level applied in conventional space write strategies, while at least the second erase power level is higher than the conventional erase power level.

In an embodiment of the invention, the first and third erase power levels are substantially equal and lower than the second erase power level.

Furthermore, the sum of the first and second erase periods is preferably shorter than half the shortest effect (i.e. mark) length, for example a 1 T duration for a code with 2 T as the shortest effect (i.e. mark) length.

The space write strategy according to the present invention using a two-stage erase boost is preferably applied to direct overwrite (DOW) in a (semi-) transparent layer of an optical record carrier comprising at least two information layers. Write strategies using such an erase boost could, for example, be applied in DVD and DVR dual-layer recording.

The information layer is preferably of the type which has a phase which is reversibly changeable between a crystal phase and an amorphous phase. Because of the similarity of the cooling problems in dual-layer record carriers and in high speed recording of single layer record carriers, the method and recording device according to the present invention, in which the above described erase power level boost is applied, could also be advantageously applied to high-speed CD-RW, DVD, and DVR recording.

Figure 4:
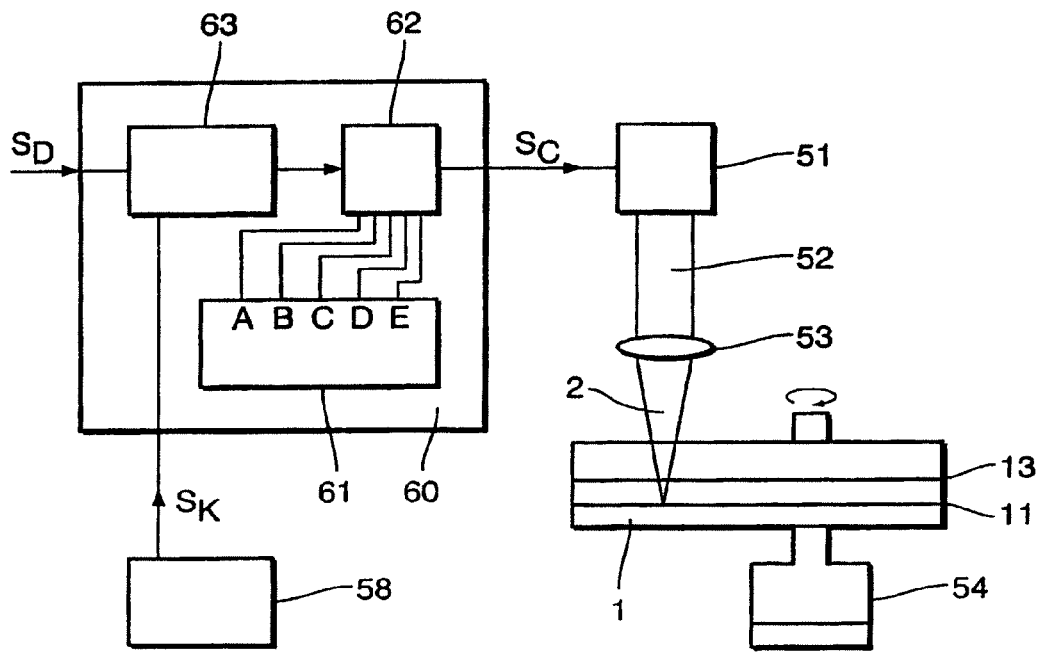

The invention will now be explained in more detail hereinafter on the basis of preferred embodiments and with reference to the accompanying drawings, in which FIG. 1a shows a cross-section of a dual-layer record carrier, FIG. 1b shows a cross-section of a semi-transparent information layer, FIG. 2 shows diagrams illustrating a data signal and a corresponding control signal for controlling the power levels of the radiation beam according to an embodiment of the present invention having a two-stage boost, FIG. 3 shows results of measurements of the single-track jitter illustrating the advantageous effect of the invention, FIG. 4 is a block diagram of a recording device according to the invention, and FIG. 5 shows diagrams illustrating control signals according to embodiments of the present invention having a one-stage boost.

FIG. 1a is a schematic representation of a dual-layer disc-shaped record carrier 1. The disc 1 comprises a polycarbonate substrate 10, two recording layers of the phase-change type 11, 13 separated by a spacer layer 12, and a cover layer 14. Data recorded in the information layers 11, 13 are written or read by a radiation beam 2, such as a laser light beam. If data are to be read from or written into the information layer 11, the other information layer 13 closer to the surface facing the laser beam 2 should be, at least partially transparent.

FIG. 1b shows an example of a cross-section of such a semi-transparent information layer 13. As shown, it comprises a phase-change layer 132 and a transparent heat sink layer 134 which are separated and covered by dielectric layers 131, 133, 135. Other stack arrangements are alternatively possible.

FIG. 2 shows diagrams of two signals used in an embodiment of the present invention, a digital data signal 20 and a control signal 30. FIG. 2a gives the value of the digital data signal 20 as a function of time, the value of the signal representing information to be recorded. When recording this data signal 20, a "high" period 21 is recorded as a mark having a length corresponding to the duration of the "high" period. A "low" period 22 is recorded as a blank area, a space, situated between the marks and having a length corresponding to the duration of the "low" period. In general, the length of a mark is substantially equal to the number of channel bit periods (number of periods of the data clock) of the data signal times the writing speed.

The data is written in an optical record carrier 1 having one or more information layers, such as an optical record carrier having two information layers as shown in FIG. 1. The marks representing the data are written along a track in the information layer by irradiating the information layer with a pulsed radiation beam. The marks are areas of the information layer having optical characteristics different from their surroundings, thus rendering an optical reading of marks possible.

FIG. 2b shows a control signal 30 corresponding to the data signal 20 in an embodiment of the invention. The control signal 30 is used for modulating the power of a radiation beam with which the marks are written on the information layer, where it is assumed that the power level of the radiation beam is proportional to the level of the control signal. FIG. 2b shows, as a function of time, a last pulse 31 of a sequence of write pulses for writing a mark 21. These write pulses have a write power level w, while the power level between the write pulses in a sequence is a bias power level b. Furthermore, a first pulse 32 of a sequence of write pulses for writing the next mark 21 after the space 22 is shown on the right-hand side. Previously written marks, if any, between the marks 21 being written are erased by means of an erase write-strategy according to a preferred embodiment of the present invention where, in one embodiment, consists of three consecutive erase periods, $t_1, t_2, t_3$.

At the beginning of the space 22, a two-stage boost is used to heat the stack quickly. The low-level first stage 33 having a first erase power level e1 for a first erase period t1 is used to prevent re-crystallization at the end of the previous mark 21. Thereafter, a second boost 34 is applied having a second erase power level e2 higher than the first erase power level e1 for a second erase period t2. After the second boost 34, the erase power is lowered to a third erase power level e3 lower than the first erase power level e1 for a third erase period t3, that is, for the remaining time of the space 22 (reference numeral 35).

Also shown as a dashed line in this diagram is a conventional space write-strategy without erase boost according to the invention. In such a conventional space write strategy, the erase power level is set to a constant level e0 higher than the third erase power level e3 during the whole period for writing the space 22. It should be noted that also a one-stage boost, where e1 is equal to e2, may be used.

The net result of the space write strategy according to the invention is the desired reduction of the stack temperature. The combination of this new write strategy and a stack with one transparent heat sink layer as shown in FIG. 1 results in a very good overwrite performance, as can be seen from FIG. 3. Here the average single-track (ST) jitter is shown as a function of the number of direct overwrite (DOW) cycles. A conventional write strategy with a cooling gap at the end of the mark shows a poor overwrite performance (line 41 with diamonds), whereas boosting of the erase power level at the beginning of a space together with a reduced erase power e3 results in a good overwrite performance (line 42 with squares), as is illustrated in FIG. 2b It should be noted that the optimum values of the erase power levels e1, e2, e3 as well as the erase periods t1, t2, t3 depend on the properties of the recording medium, the laser pulse, and the laser spot on the information layer. As an example, the following values could be used:
t1=½ T; t2=½ T; e1=2.3 mW; e2=2.6 mW; e3=1.1 mW.

Figure 5A:
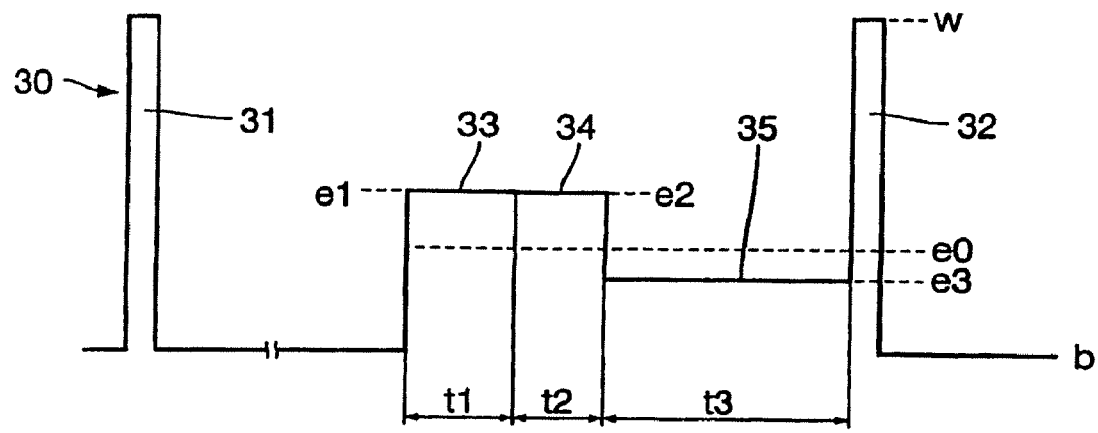
Figure 5B:
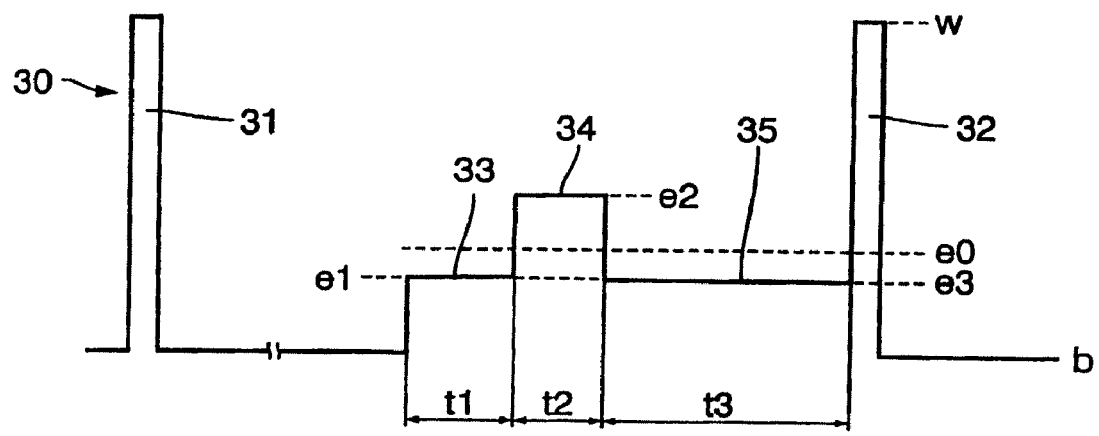

It should be noted that, instead of the two-stage boost as shown in FIG. 2b, a one-stage boost may alternatively be used. An embodiment of such an one-stage boost is illustrated in FIG. 5a where the first and second erase power levels e1 and e2, which together form the one-stage boost, are equal but higher than the third erase power level e3. The first and second erase power levels e1 and e2 of the boost are higher than the constant erase power level e0 used in a conventional space write strategy. A further embodiment is illustrated in FIG. 5b where the first and third erase power levels e1 and e3 are equal, but lower than the second erase power level e2 forming the one-stage boost. Again, the second erase power levels e2 of the boost is higher than the constant erase power level e0 used in a conventional space write strategy.

It should be noted that the term "equal" does not necessarily mean "exactly the same", but rather "approximately equal", since slight differences from the equal level do not take the advantages of the invention away.

FIG. 4 shows an embodiment of a recording device according to the present invention for recording data on a disc-shaped optical record carrier 1. Alternatively, the record carrier may be in the form of a tape. A data signal $S_D$, comprising the information to be recorded, is applied to a control unit 60. A current source 61 within the control unit 60 has five outputs, A, B, C, D, and E. Output A provides a current which, when fed into a radiation source 51 through a control signal $S_C$, will result in a radiation beam 52 having a write power level (w). Likewise, outputs B, C, D and E provide currents resulting in the bias power level (b), the first erase power level (e1), the second erase power level (e2), and the third erase power level (e3), respectively. The current of each output A, B, C, D, and E can be selected by a switch unit 62. The switch unit 62 is operated by a pattern generator 63 controlled by the data signal $S_D$ and a clock signal $S_K$. The pattern generator 63 transforms the data signal $S_D$ into the control signal having the power levels in accordance with a desired pattern. The clock signal $S_K$ is obtained from a clock generator 58.

The control signal $S_C$ provided at the output of the control unit 60 is applied to the radiation source 51 and controls the power of the radiation beam 52 generated by the radiation source 51. The radiation beam is focused onto an information layer 11 (or 13) of the record carrier 1 by a lens 53. The disc-shaped record carrier 1 is rotated about its center by a motor 54.

The invention claimed is:

1. A method of recording marks representing data in an information layer of a record carrier comprising the act of: irradiating the information layer by a pulsed radiation beam, each mark being written by a sequence of pulses, the recorded marks being erasable by irradiating the information layer with an erase radiation beam,
wherein said erase radiation beam between two successive sequences of pulses for writing marks comprises three consecutive erase periods, and said erase radiation beam has a first erase power level for a first erase period, a second erase power level higher than or equal to said first erase power level for a second erase period, and a third erase power level lower than said first erase power level for a third erase period.

2. The method as claimed in claim 1,
wherein said first erase power level and said third erase power level are substantially lower than said second erase power level.

3. The method as claimed in claim 1,
wherein said second erase power level is lower than the write power level of said pulses of said pulsed radiation beam for recording marks.

4. The method as claimed in claim 1,
wherein said third erase power level is higher than the bias power level between said pulses of said pulsed radiation beam for recording marks.

5. The method as claimed in claim 1,
wherein said information layer has a phase which is reversibly changeable between a crystal phase and an amorphous phase.

6. The method as claimed in claim 1,
wherein said record carrier comprises at least two information layers.

7. The method as claimed in claim 6,
wherein at least one of said at least two information layers is an at least partially transparent layer.

8. A method of recording marks representing data in an information layer of a record carrier comprising the act of: irradiating the information layer by a pulsed radiation beam, each mark being written by a sequence of pulses, the recorded marks being erasable by irradiating the information layer with an erase radiation beam,
wherein said erase radiation beam between two successive sequences of pulses for writing marks comprises three consecutive erase periods, and said erase radiation beam has a first erase power level for a first erase period, a second erase power level higher than or equal to said first erase power level for a second erase period, and a third erase power level lower than said second erase power level for a third erase period, and
wherein said first erase period and said second erase period are shorter than said third erase period.

9. A method of recording marks representing data in an information layer of a record carrier comprising the act of: irradiating the information layer by a pulsed radiation beam, each mark being written by a sequence of pulses, the recorded marks being erasable by irradiating the information layer with an erase radiation beam,
wherein said erase radiation beam between two successive sequences of pulses for writing marks comprises three consecutive erase periods, and said erase radiation beam has a first erase power level for a first erase period, a second erase power level higher than or equal to said first erase power level for a second erase period, and a third erase power level lower than said second erase power level for a third erase period, and
wherein the sum of said first erase period and said second erase period is shorter than half the shortest mark being recorded.

10. A recording device for recording marks representing data in an information layer of a record carrier by irradiating the information layer by a pulsed radiation beam, the device comprising:
a radiation source providing said radiation beam; and
a control unit for controlling a power of said radiation beam, such that each mark is written by a sequence of pulses and the recorded marks are erasable by irradiating the information layer with an erase radiation beam,
wherein the control unit is operative for controlling said radiation beam such that said erase radiation beam between two successive sequences of pulses for writing marks comprises three consecutive erase periods, and said erase radiation beam has a first erase power level for a first erase period a second erase power level higher than or equal to said first erase power level for a second erase period, and a third erase power level lower than said first erase power level for a third erase period.

11. The recording device as claimed in claim 10,
wherein said control unit is operative for controlling said radiation beam such that the first erase power level and the third erase power level are substantially equal and lower than the second erase power level.

* * * * *